United States Patent [19]

Takasaki

[11] Patent Number: 5,430,733
[45] Date of Patent: Jul. 4, 1995

[54] DIGITAL TRANSMISSION SYSTEM FOR MULTIPLEXING AND DEMULTIPLEXING SIGNALS

[75] Inventor: Yoshitaka Takasaki, Tokorazawa, Japan

[73] Assignee: Hitachi, Ltd., Tokyo, Japan

[21] Appl. No.: 452,511

[22] Filed: Dec. 19, 1989

[30] Foreign Application Priority Data

Dec. 28, 1988 [JP] Japan .................. 63-331378

[51] Int. Cl.$^6$ .................................................. H04J 3/00
[52] U.S. Cl. .................................. 370/110.4; 375/359; 359/154; 341/51
[58] Field of Search ............... 370/110.4, 110.1, 112; 375/110, 55, 20; 341/50, 51, 63, 81; 359/115, 135, 154

[56] References Cited

U.S. PATENT DOCUMENTS

| | | | |
|---|---|---|---|
| 4,408,325 | 10/1983 | Grover | 370/110.4 |
| 4,651,026 | 3/1987 | Serfaty et al. | 375/20 |
| 4,661,801 | 4/1987 | Chen et al. | 375/20 |
| 4,818,995 | 4/1989 | Takahashi et al. | 375/38 |

FOREIGN PATENT DOCUMENTS 60-16147  4/1985  Japan .

OTHER PUBLICATIONS

Jacob Millman, Ph.D. "Microelectronics" 1979 pp. 93–94.

Primary Examiner—Douglas W. Olms
Assistant Examiner—Min Jung
Attorney, Agent, or Firm—Fay, Sharpe, Beall, Fagan, Minnich & McKee

[57] ABSTRACT

Data transmission and recovery, in either the optical or the electrical domain, can be accomplished with mBnB encoding with the violation of one or more of the n code pulses for multiplexing overhead signals, with a carried clock being indicated by periodic fixed position transitions, and with both extraction of the clock and demultiplexing of the overhead signals being accomplished with only logical processing and signal delay. For the above, transmission and processing in only the optical domain can be easily obtained as well as a circuitry that can be constructed cheaply and on a small scale, particularly by integration on a single substrate. The logical processing involves logical combinations of two or more of the received encoded signal, a delay of the received encoded signal, an output of a previous logical combination, and a delayed output of a previous combination, an extracted clock, and a frequency division or a frequency multiplication of an extracted clock.

64 Claims, 12 Drawing Sheets

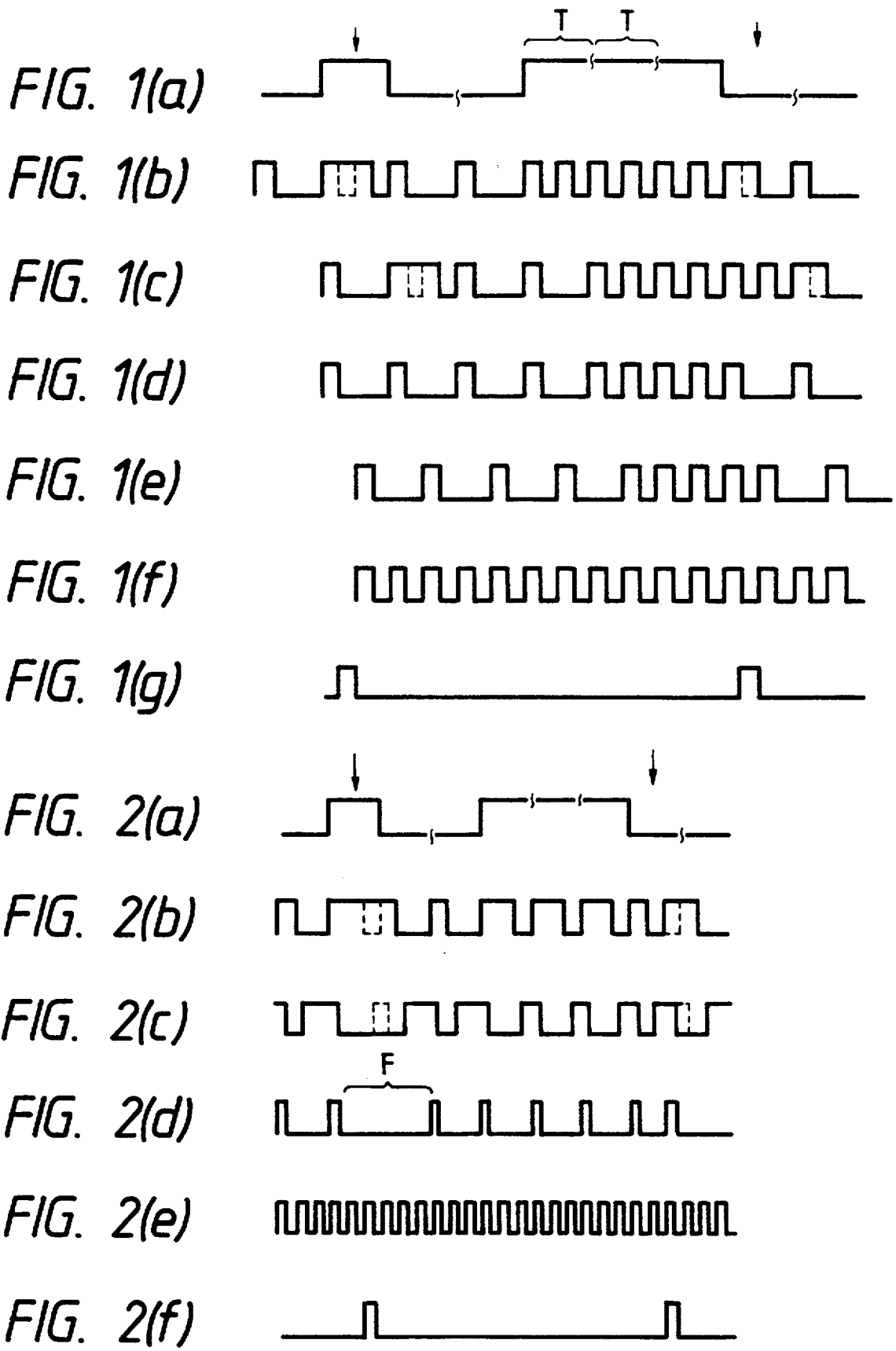

FIG. 6(h)

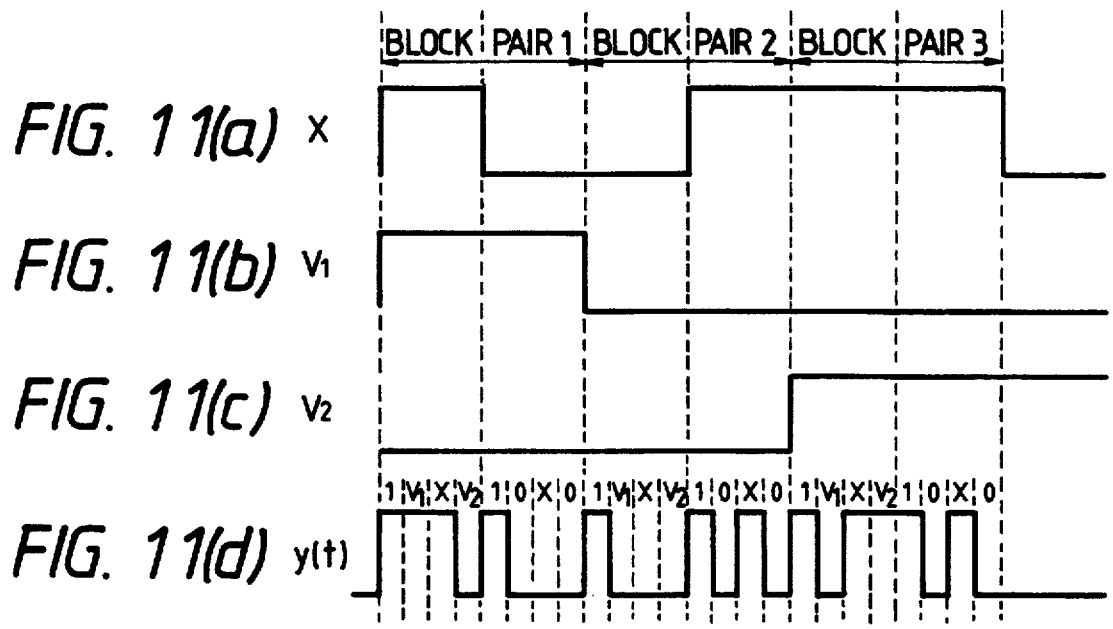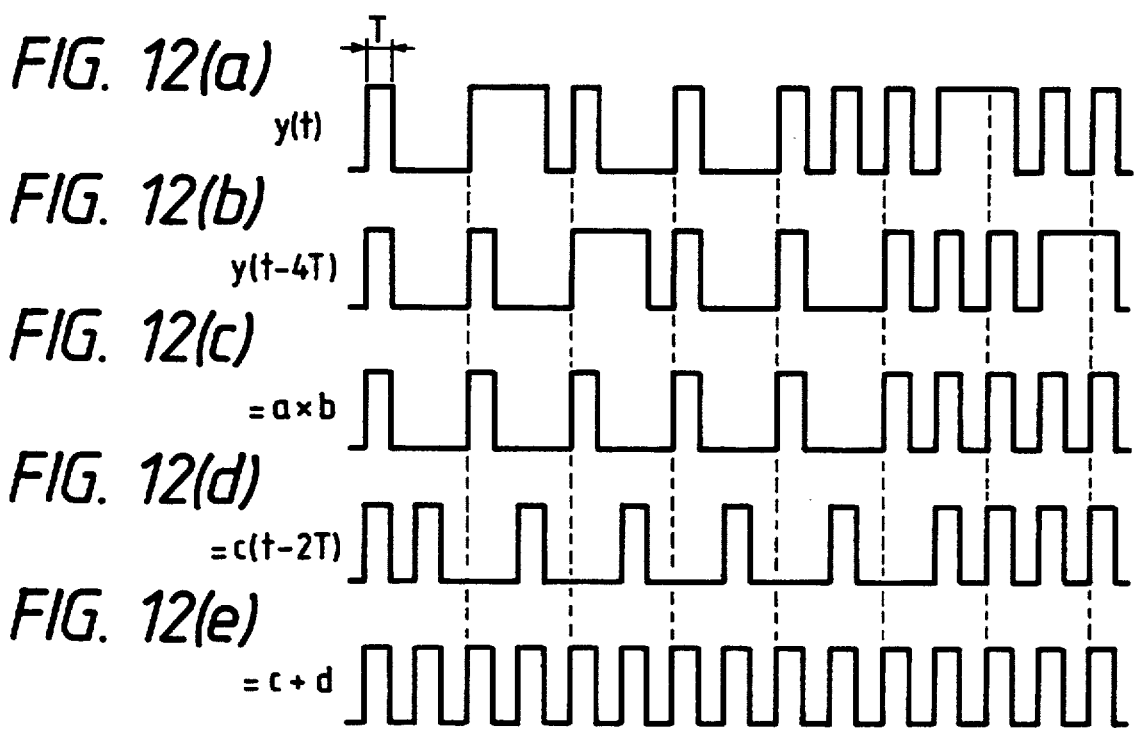

FIG. 15
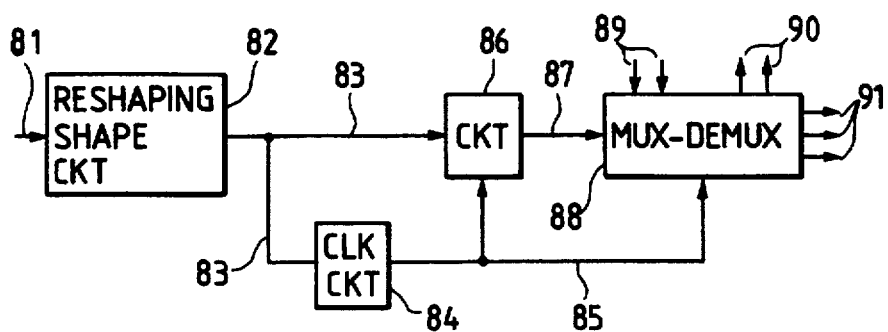
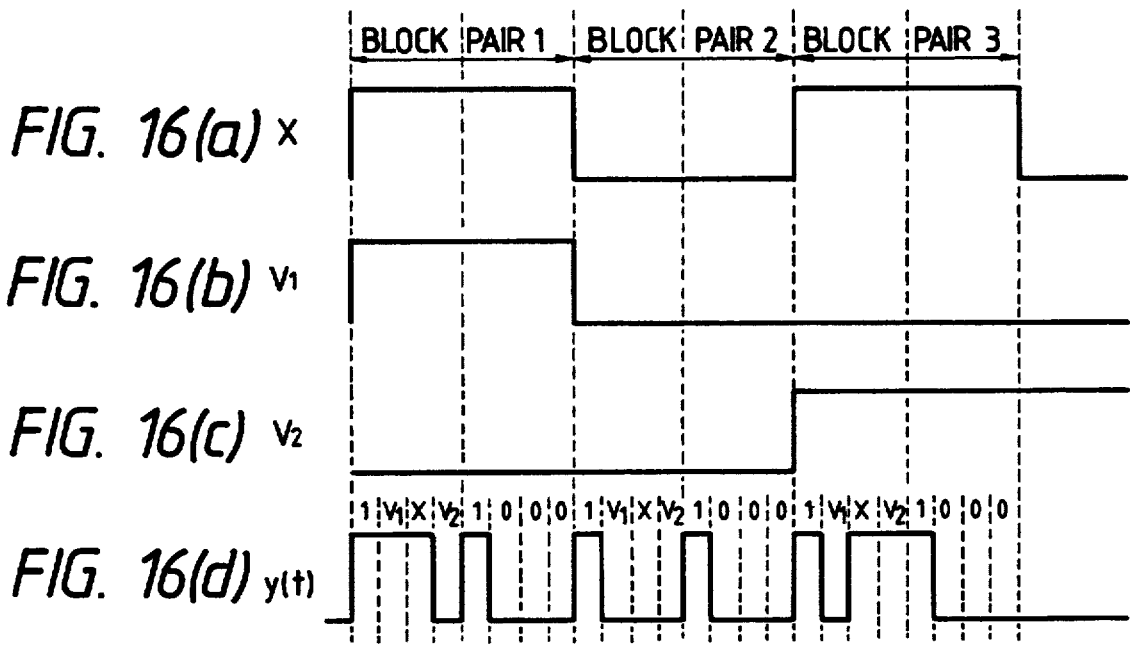
FIG. 16(a) x
FIG. 16(b) v₁
FIG. 16(c) v₂
FIG. 16(d) y(t)

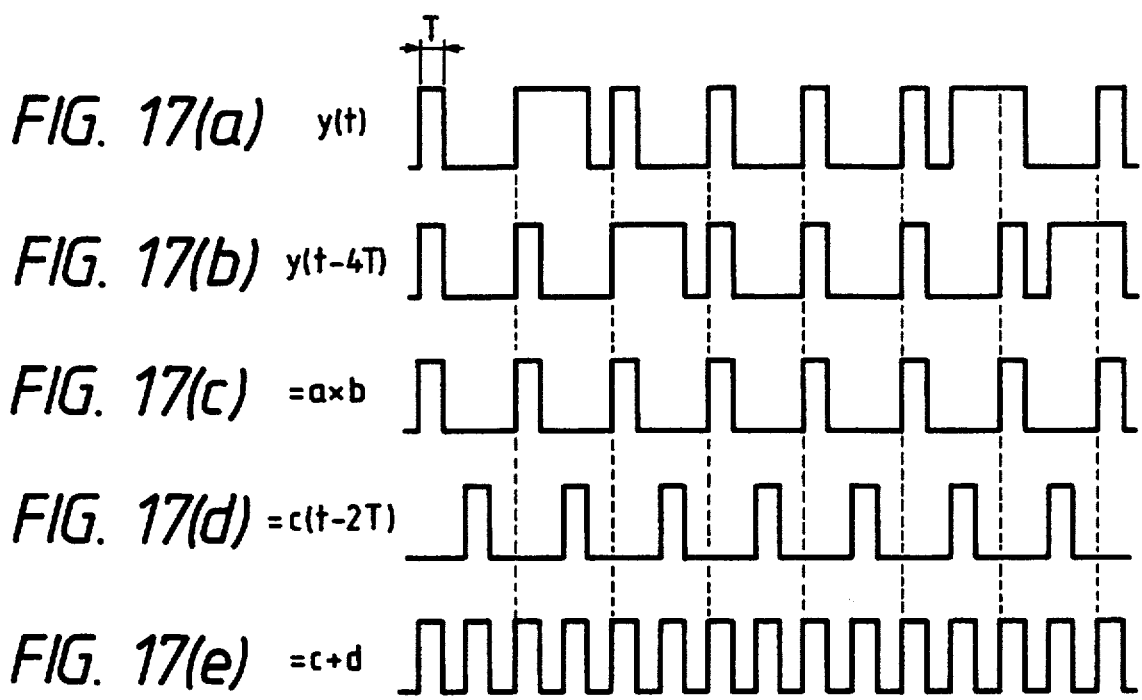
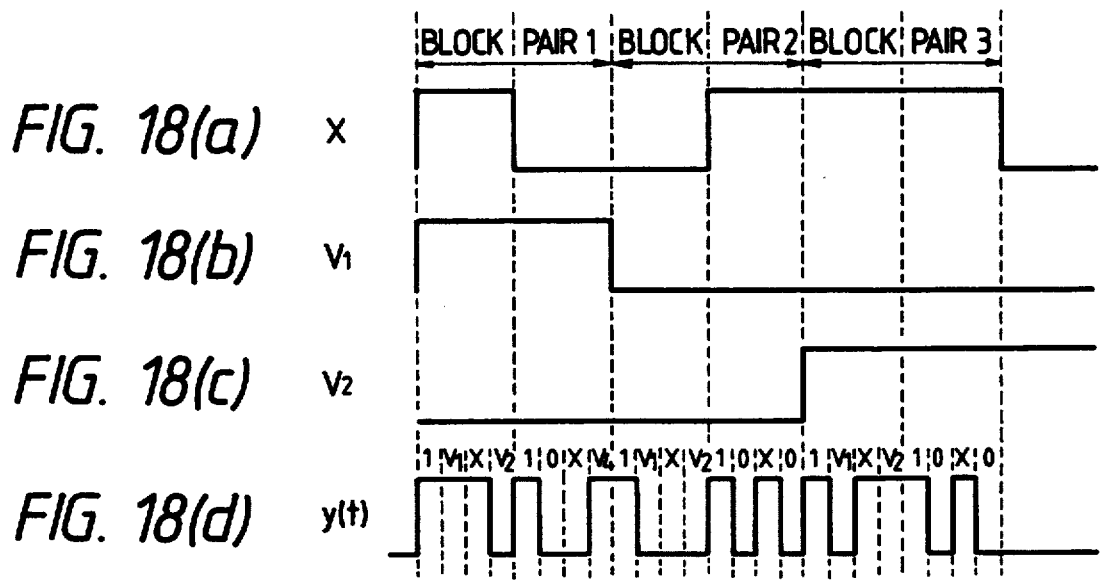

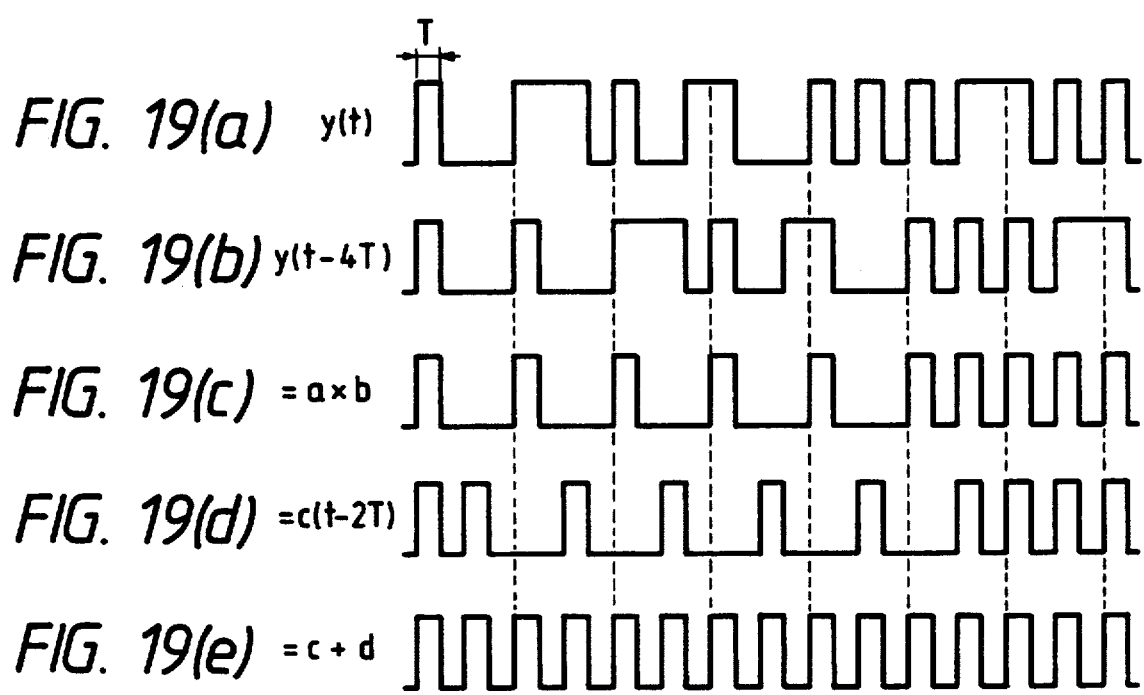

FIG. 20
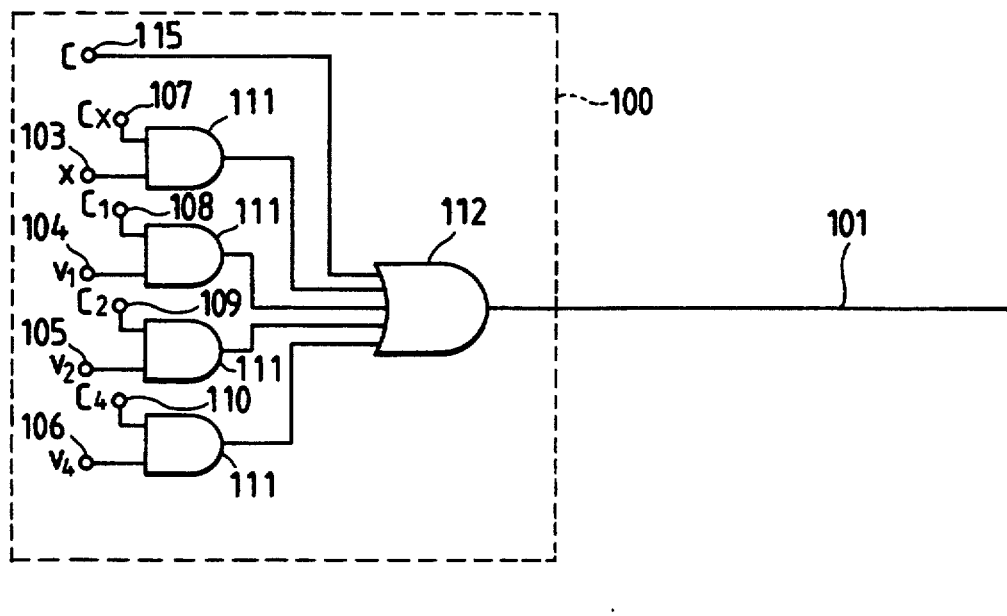
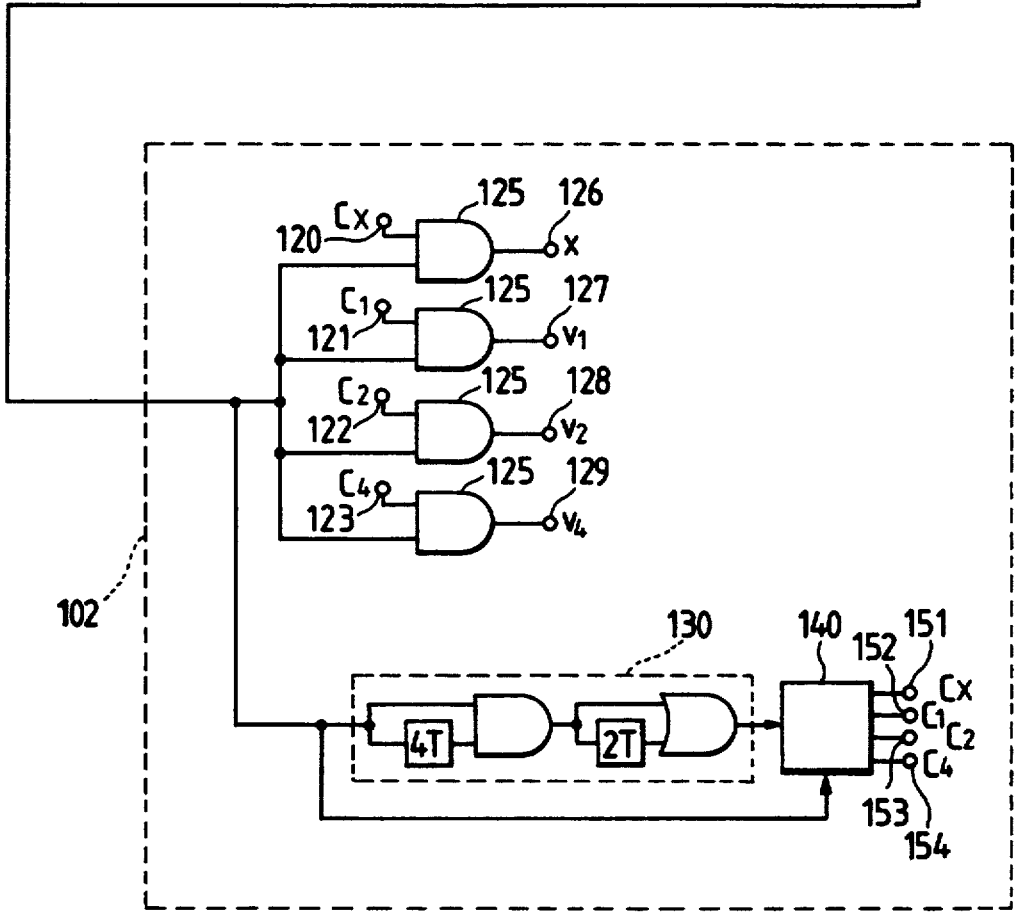

$P = (N-1) \cdot n / 2$

DIGITAL TRANSMISSION SYSTEM FOR MULTIPLEXING AND DEMULTIPLEXING SIGNALS

BACKGROUND OF THE INVENTION

This invention relates to a digital transmission system which converts information to the form of a pulse train, multiplexes an overhead signal with the pulse train, transmits the pulse train, reproduces the clock on the receiver side and demultiplexes or re-multiplexes the received signals.

Digital transmission systems have generally the structure such as shown in FIG. 14. Input signals 51, are fed to a multiplexer, MUX, 52, where a frame signal and the like are generated and all of them are multiplexed into one pulse stream or train and are then fed to an office repeater terminal 55 through a transmission line 53, where signals 54, e.g., an alarm signal, an order wire signal, etc, necessary for transmission are further added. The signals are then delivered to a transmission line 56. If the transmission distance is long, the attenuated signal is amplified by an intermediate repeater 57 and then delivered to a next transmission line 58. After extracting the alarm signal, the order wire signal, etc, 54 from the signal pulse train, an office repeater 59 on the receiver side transmits the signal pulse train to a demultiplexer, DEMUX 62, through a transmission line 61. The signals 51 thus separated are transferred to other apparatuses, such as switching equipment 65 through a transmission line 63 for further use, for example on transmission line 64.

The fundamental constituent elements of such a digital transmission system can be divided into a transmission processing circuit and a multiplexing-demultiplexing conversion circuit, as shown in FIG. 15. In other words, the received pulse train 81 is sent as a reshaped signal 83 by a reshaping circuit 82, to a clock recovery circuit, CLK CKT 84, and to a decision and regeneration circuit, CKT 86. In the clock recovery circuit the clock pulse 85 is recovered from the reshaped input signal pulse train 83 and is used for decision and regeneration of the signal in the decision and regeneration circuit 86 and for multiplexing-demultiplexing and conversion in the multiplexing-demultiplexing circuit, MUX-DEMUX 88. The transmission processing is conducted by the reshaping circuit 82, the clock recovery circuit 84 and the decision and regeneration circuit 86, and the signal pulse train 81 that is attenuated and inputted is outputted as a regenerated pulse train 87.

In the multiplexing-demultiplexing conversion circuit 88, on the other hand, generation of a frame for multiplexing the signals, detection of a frame pulse for demultiplexing the multiplexed signals, multiplexing-demultiplexing of an alarm signal, an order wire signal, etc, necessary for maintenance and operation of signal transmission, line coding necessary for transmission processing, detection of code errors, and the like, are carried out. Input and output signals 89, 90 are housekeeping signals such as the alarm and order wire signals, for example, and main information signals 91 may be voice or video signals.

The transmission processing and multiplexing-demultiplexing conversion are necessary irrespective of the transmission distance. In other words, these processings are necessary not only after each of the transmission lines 56 and 58 which generally have a relatively large distance but also after each of the transmission lines 53, 61, 63, 64 having a relatively short distance inside the office. The reason why such processings are necessary in the short distance zone is mainly because clock recovery is necessary. So-called "external timing" which sends the clock signals by a separate system is not preferred because a manual operation such as phase adjustment becomes necessary.

Sometimes, clock recovery becomes necessary in the transmission zone having a smaller distance than the intra-office transmission, such as transmission inside the apparatus. When the signal processing speed becomes extremely high as in the recent systems, crosstalk between the wirings inside the apparatus cannot be neglected and could cause problems in many cases. In such a case, it is necessary either to extract the clock and use it to regenerate the signal, or to make use of an optical fiber for the wirings, because optical fibers do not suffer from cross-talk.

In the preceding discussion, electrical processing was considered. Investigation has been started recently in optical fiber communication to process light directly (all optical transmission) so as to realize economical ultra-high speed transmission without converting light into electric signals as has been made in the prior art technique.

In such a case, in the optical domain, (1) simplification of the processing of the multiplexing frame and (2) simplification of the clock recovery become common problems for accomplishing the system.

A typical example of the signal processing circuit for processing light in the optical domain without converting optical information to an electric signal is an optical logic device using a multi quantum well etalon of GaAs-/AlGaAs such as shown in FIG. 3a. The device comprises a multiple quantum well 45 consisting of a GaAs substrate 41, reflecting mirrors 42 and alternate layers of GaAs 43 and AlGaAs 44. The quantum well 45 has non-linear characteristics such that its output Z is turned ON and OFF depending on whether the sum of input light X and Y exceeds a predetermined value (see FIG. 3b). Functions such as logical sum (OR), logical product (AND), bi-stable operation, and the like, for optical signals can be accomplished by use of such a device, but it has been difficult to provide it with diversified functions such as exclusive-OR operation in the same way as in the conventional electrical circuit.

SUMMARY OF THE INVENTION

Accordingly, it is an object of the present invention to constitute a transmission system which can be accomplished by the combination of simpler signal processings than those used in the conventional electrical systems.

Also clock extraction by optical processing alone has been difficult, and it is another object of this invention to provide means to alleviate this problem.

FIG. 4 shows relatively simple signal processing as an example of the transmission in a system that has been used at present in the electrical system of Japanese Patent Publication No. 60-16147. It transmits the original signal such as shown in FIG. 4(a) after converting it to a DMI code shown in FIG. 4(b), by using a DMI (Differential Mark Inversion) rule as its conversion rule. In other words, it converts "1" to "11" or "00" and "0" to "10" or "01". At the portion represented by arrows in FIG. 4(a), however, as represented by dotted lines in FIG. 4(b) the portion which is to be converted to "11" is converted to "00" and the portion which is to be converted to "10" is converted to "01", in order to insert overhead signals, such as voice for coordination action, a frame signal, an order wire and other signals. Insertion of such specific signals has generally been made by narrowing the interval of the signal pulses and inserting them into the evacuated portions. However since such a method makes signal processing complicated, it is not believed suitable for all optical processing.

The use of the coding rule modification such as shown in FIG. 4(b) is referred to as "violation", and this method provides a waveform such as shown in FIG. 4(c). This is believed suitable for optical signal processing because it does not need the processing such as narrowing the pulse interval when the overhead signals or the like are required to be superposed.

However, it is difficult to extract the clock signals by optical processing alone by applying such a method to an all optical network.

As described above, although the prior art technique includes a coding system suitable for conducting relatively easily the electrical processing of signals such as the transmission frame, the application is relatively limited because it has great redundancy and causes higher pulse rates and broader band width. It does not satisfy, either, the conditions for easily carrying out clock extraction by use of only optical processing as will be required for the all optical network.

It is an object of the present invention to provide a digital transmission system which can easily carry out processing of such signal as the transmission frame and can easily extract the clock signal.

The object described above can be accomplished by use of transmission line codes which are suitable for transmission frame processing and for simplification of clock extraction.

In other words, an effective means for solving the problems is the construction of transmission line codes utilizing violation of a coding rule, so that drop and insert of specific signals, correction signals and the like, can be made easily and clock components can be extracted by simple logical processing.

More specifically, the present invention modifies and uses the construction of a so-called "mBnB code" which converts m bits of pulses into n bits and is known as a generalized form of transmission code so as to accomplish the object described above.

The following description will deal primarily with all optical transmission (all the processings are conducted in the form of light as it is), that is processing in the optical domain by way of example.

BRIEF DESCRIPTION OF THE DRAWING

Further objects, features and advantages of the present invention will become more clear from the following detailed description of a preferred embodiment, shown in the drawing, wherein:

FIGS. 1(a) to (g), 2(a) to (f), 5(a) to (h), 6(a) to (h), 11(a) to (d), 12(a) to (e), 16(a) to (d), 17(a) to (e), 18(a) to (d), and 19(a) to (e) are time charts useful for explaining the principle of the present invention;

FIGS. 7 through 10, 20, 21 and 23(a) to (c) are logic circuit diagrams useful for explaining the embodiments of the present invention;

FIGS. 14 and 15 are explanatory views showing the structure of the system where the present invention is to be applied; and FIGS. 22(a) to (e) are time charts useful for explaining the embodiment of the present invention;

DETAILED DESCRIPTION

Figure 3A:
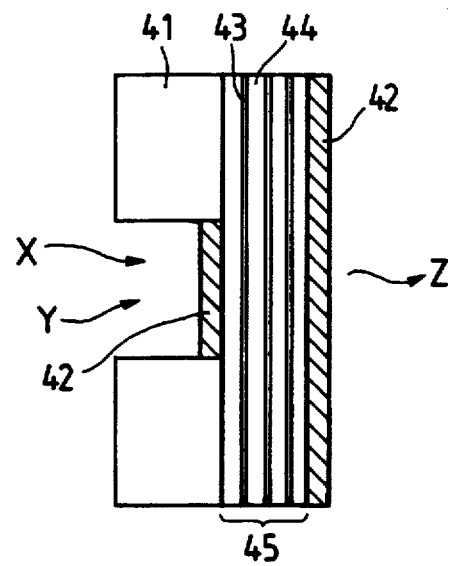
FIGS. 3(a) and (b) are an explanatory view and characteristic plot showing an example of an optical logic circuit element and its operation.
Figure 3B:
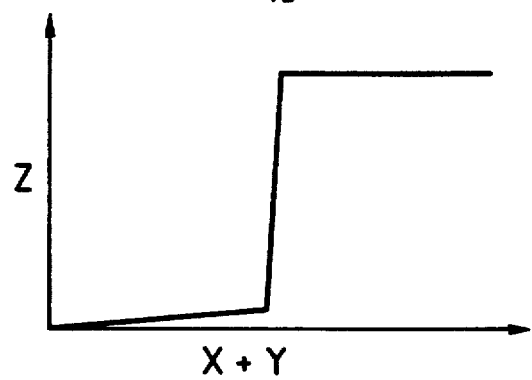

FIG. 1 shows an example of a 1B4B code and FIG. 2 shows an example of a 1B3B code. The 1B2B code shown in FIG. 4 can be applied by combining it with a clock extraction processing, to be described later.

FIG. 1(b) represents the original code of FIG. 1(a) after 1B4B coding. Its coding rule is such that one bit representing "x" of the original signal is coded to 10x0. However, time slots T indicated by arrows use violation, whereby coding is made as 11x0. Each of these violation portions is used for representing multiplexed overhead, the pulse for a frame signal, for example. In FIG. 1(b), the cases where violation does not exist are represented by dotted lines.

The waveform obtained by delaying the waveform of FIG. 1(b) by 1 time slot T of the original signal is shown in FIG. 1(c) and their logical product becomes the waveform shown in FIG. 1(d). The waveform shown in FIG. 1(f) can be obtained by the logical sum of the pulse train of FIG. 1(d) and FIG. 1(e). The signal shown in FIG. 1(e) is the delay pulse train obtained by delaying the signal of FIG. 1(d) by the ½ time slot of the original signal. The waveform FIG. 1(f) can as such be used as the clock, and in the case where the transmission distance is long and deterioration due to noise, etc, is remarkable, the clock of FIG. 1(f) may be stabilized by applying it to optical PLL (Phase Locked Loop) circuits or the like. If the logical product is calculated between the delay waveform obtained by delaying this clock waveform of FIG. 1(f) by ¼ T and the waveform of FIG. 1(b), the frame pulse due to violation, i.e., violation pulse, can be detected as shown in FIG. 1(g).

Efficiency of this code is from 25 to 30% even when the improvement in efficiency resulting from utilization of violation is taken into consideration because only 1 bit among 4 bits of one block is used. In the case of the application to the all optical transmission line or the like, that is the use of only optical processing and transmission (in the optical domain), efficiency of such a level is sufficient in view of the ultra-high speed of optical processing as compared to electrical processing.

Next, a method of improving efficiency will be described. In the description given above, "x" is coded to 10x0 but it is possible to insert violations $v_1$ and $v_2$ to get "$1v_1xv_2$". In this form as it is, however, extraction of the clock by logical processing described above becomes difficult. Therefore, coding is made to produce $1v_1xv_210x0$ by using two blocks as a pair as shown in FIG. 11 so that efficiency is improved to 50% and clock extraction is insured by logical processing as shown in FIG. 12. Efficiency of a CMI (Coded Mark Inversion) code and a DMI (Differential Mark Inversion) code, that have been widely used conventionally, is 50%, too. The operation principle of FIG. 12 is the same as that of FIG. 1 and the explanation is therefore omitted.

Efficiency can be further improved by enlarging the block length n. In other words, efficiency $\eta$ is 7/12=58% when coding is made to 1v₁xv₂xv₃10x0x0 with n=6. Generally, when n is an even number.

$$\eta = \{(n - 1) + (n/2 - 1)\}/2n$$
$$= (3/2n - 2)/2n = 3/4 - 1/n$$

Figure 13:
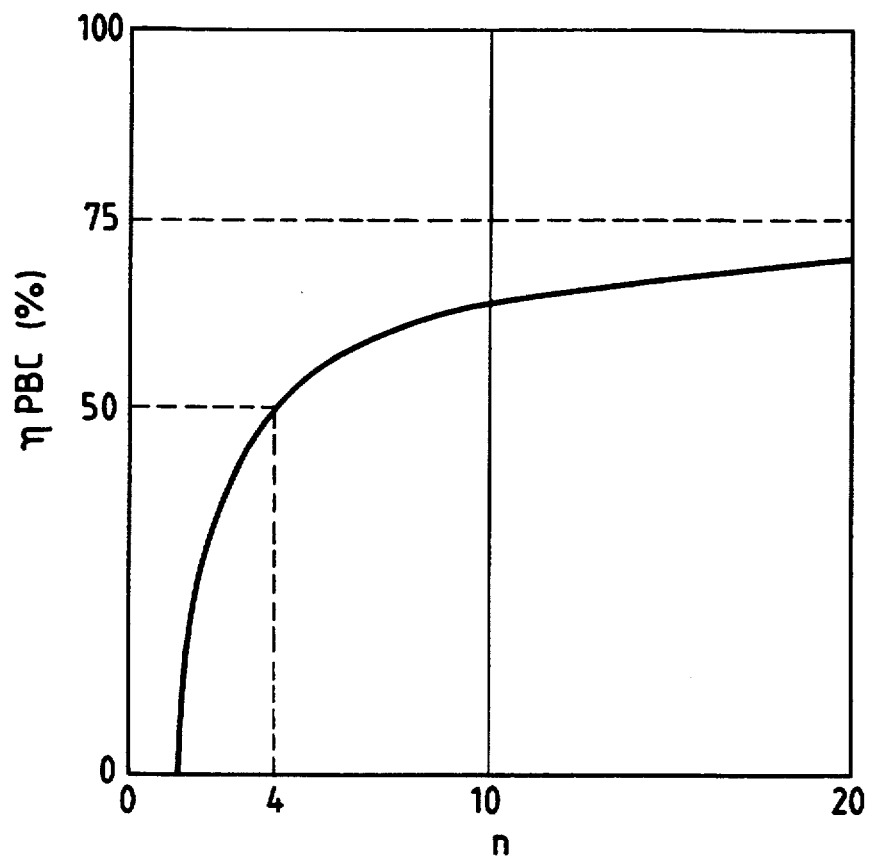
FIG. 13 shows efficiency of the transmission codes in accordance with the present invention.
Figure 14:
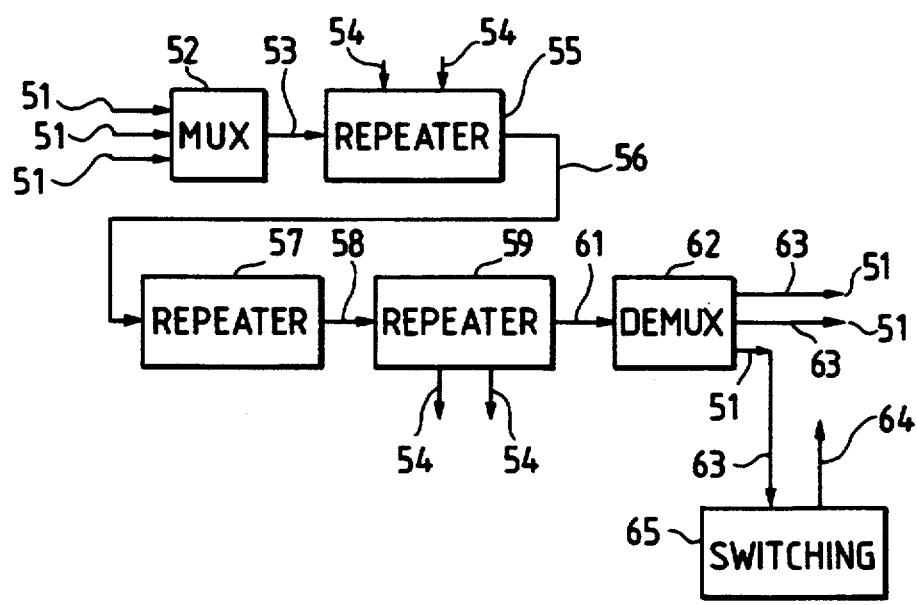

Accordingly, η approaches 75% when n is made sufficiently large. This feature is shown in FIG. 13.

The above explains the code which uses two blocks as a pair (PBC: Paired Block Code), but a code using three blocks as a trio is also applicable. If n=4, for example, efficiency can be improved to 58% by coding the signal to 1v₁xv₂1v₃xv₄10x0. Efficiency becomes 67% when n=6. Generally, if n is an even number.

$$\eta = \{2(n - 1) + (n/2 - 1)\}/3n$$
$$= ((5/2)^n - 3)/3n = 5/6 - 1/n$$

Therefore, the upper limit of efficiency is 83%.

Furthermore, efficiency can be improved by increasing the number of blocks in one set.

As a further generalization, a code permitting extraction of the clocks by logical processing can be obtained by always putting "1" to the leading part of the block and inserting "0" either continuously or periodically with some of the blocks. Still alternatively, in the case where all the blocks use violation, extraction of the clock components becomes possible by logical processing by constituting the code in such a manner as to generate periodically "01" and "10". Two kinds of further generalized examples will be explained next.

FIG. 16 shows an example with a first block being of the form 1 v₁xv₂, and zero is inserted continuously at portions other than the leading part of the second block of each two block set. In this case, as shown FIG. 17, there can be obtained clock pulses with a block repetition period (FIG. (c)) through a single cycle of logical processing. In the case of FIG. 12, it is necessary to obtain the pulses having the block repetition period such as shown in FIG. 17(c) by frequency-dividing the pulse train of FIG. 17(e), but this FIG. 16 and 17 example eliminates such a necessity and can simplify the logical processing. Note that the signal of FIG. 17(a) is that of FIG. 16(d), which is the original information signal 16(a) multiplexed with the violation pulses of FIGS. 16(b) and 16(c).

The above explains the coding system which inserts zero into a specific block of combined blocks but does not use violation in the specific block. However, the logical processing can be further simplified by using related violation in the interlocking arrangement with other blocks, for the specific blocks such as described above.

FIG. 18 shows an example of a two block set, where violation v₄ is inserted into the latter half of the second block of the block pair 1 in the interlocking arrangement with a specified relation with violations v₂ of the first block of the block pairs 1 and 2. In other words, if both of v₂ are "0" and v₄ is "1", no influences at all are exerted on the extraction of the clock component as shown in FIG. 19. If the frame pulses are detected by use of the trio consisting of v₂ (at two positions) and v₄, logical processing for detecting the frame, that has been much complicated conventionally, can be simplified. According to the prior art technique, a specific pattern is inserted with a frame period (generally at least 100 bits) in order to detect this frame pulse. Therefore, if the same pattern is contained in the signal pattern or if the periodic pattern disappears due to transmission error, misframing is likely to occur. Therefore, the prior art technique requires extremely complicated processings such as the use of framing protection.

In accordance with the method described above which uses the trio of v₂s and v₄ frame detection can be made by merely checking if v₄ is "1" or not. It is effective to insert the trios of v₂s and v₄ into two positions in order to reduce the influences of the transmission error. According to this method, the probability of misframing is reduced to 10⁻¹⁸ for an error rate of 10⁻⁹ and it is possible to regard the influence of the transmission error as being substantially absent.

FIGS. 2(a) to (f) show an example of the 1B3B coding, where the signal "x" is converted to 1x0. In the drawing, the portion into which violation is inserted is represented by arrows where "x" is converted to 1x1. (The portions being free from violation are represented by dotted lines.). To extract the clock from this signal, an optical polarity inverter must be used for all optical processing. Assuming that such a polarity inverter is available sufficiently economically, extraction of the clock components by use of the polarity inverter is as follows. When the waveform of FIG. 2(b) is inverted and delayed a small amount (much less than a pulse width) the waveform of FIG. 2(c) can be obtained. When the logical product between the signals of FIGS. 2(b) and (c) is calculated, there can be obtained the waveform of FIG. 2(d) (this shows only the case where violation exists). The clock is obtained by processing the waveform of FIG. 2(d) but the following processings are conducted to compensate for the long absence of pulses in the portion F. A first logical sum is calculated between the signal of FIG. 2(d) and a delay signal obtained by delaying the original signal of FIG. 2(d) by ⅔ of an original time slot. A second logical sum is calculated between the resulting first logical sum waveform and a delay waveform obtained by delaying the first logical sum waveform by the ⅔ of a time slot. Finally, a third logical sum is calculated between the resulting second logical sum waveform and a delay signal obtained by delaying the second logical sum waveform by ⅓ of a time slot and there can be obtained the waveform (e). Whether this waveform is as such used as the clock or is used after passing through an optical PLL is determined depending on the signal-to-noise ratio of the received optical signal.

The frame pulse shown in FIG. 2(f), can be detected by calculating the logical product between the pulse of FIG. 2(d) delayed by ⅔ of a time slot and the waveform of FIG. 2(b).

Figure 5A:
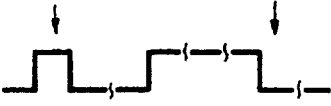
Figure 5B:

FIGS. 5(a) to (h) show an example of the 1B2B coding. This coding changes codes "1" to "11" or "00" and "0" to "10". As to violation, it will be assumed that "11" is inverted to "00", "00" to "11" and "10" to "01". FIG. 5(b) shows the converted waveform obtained from the original signal of FIG. 5(a). Violation is inserted into the positions represented by arrows and the waveform without violation is represented by a dotted line.

Figure 5C:
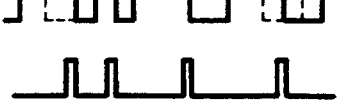
Figure 5D:
Figure 5E:
Figure 5F:
Figure 5G:
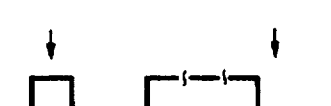
Figure 5H:

The execution of the clock extraction processing will be made with this system, too, on the assumption that the optical inverter can be used economically. FIG. 5(c) shows the waveform obtained by inverting and somewhat delaying the waveform of FIG. 5(b). When the logical product is calculated between the waveforms of FIGS. 5(b) and (c), there can be obtained the waveform of FIG. 5(d). The logical sum is calculated between the waveform obtained by delaying the waveform of FIG. 5(d) by 1 time of a time slot and the waveform of FIG. 5(d), and the waveform of FIG. 5(f) can be obtained. The logical sum between the waveform of FIG. 5(g) obtained by delaying the waveform of FIG. 5(f) by ½ of a time slot and the waveform of FIG. 5(f) is the waveform of FIG. 5(h). In the waveform of FIG. 5(h), fall-off of pulse exists at one position but if the logical sum between the waveform of FIG. 5(h) and the waveform obtained by delaying the waveform of FIG. 5(h) by half of a time slot is obtained, it can be used as a continuous clock pulse, that is with no fall-off.

Figure 4A:
FIGS. 4(a) to (c) are useful for explaining the transmission line codes used in a conventional electrical system.
Figure 4B:
Figure 4C:
Figure 6A:
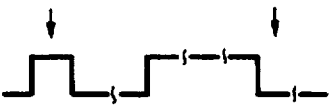
Figure 6B:
Figure 6C:
Figure 6D:
Figure 6E:
Figure 6F:
Figure 6G:

FIGS. 6(a) to (h) show an example of the 1B2B code processing of the present invention applied to the original waveform of FIG. 6(a), which is the same as the one shown in FIG. 4. The clock pulse can be obtained by the same processing as described with respect to FIGS. 5(a) to 5(h).

Figure 7:
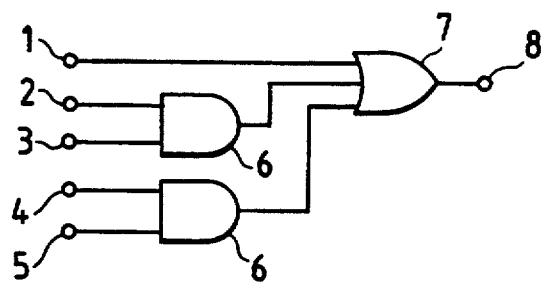

Hereinafter, an embodiment of hardware for the present invention will be described with reference to FIGS. 7 and 8. FIG. 7 shows an example of the code converter for generating the 1B4B code explained with reference to FIGS. 1(a) to (g). The information signal is applied to the input terminal 2 and the auxiliary signals (frame signal, order wire signal, alarm signal, etc) are applied to the input terminal 4. Clock pulses having mutually different phases (but having the same period as that of the original signal and having the pulse width which is ¼ of the period of the original signal) are applied to the input terminals 1, 3, 5, respectively. The logical products of the information and auxiliary signals with the respective clock pulses are calculated by the logical product circuits 6. The OR gate 7 generates the logical sum of the output of the logic circuits 6 and the clock pulse applied to the input terminal 1 and the logical sum is outputted to the output terminal 8. This logical sum at output terminal 8 is the pulse train shown in FIG. 1(b), which is converted to optical signals and then transmitted.

Figure 8:
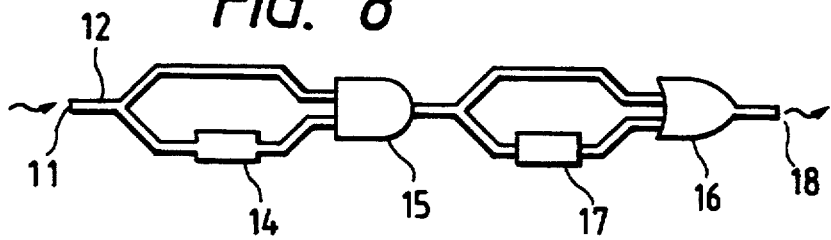

FIG. 8 shows the processing circuit for generating the clocks explained with reference to FIGS. 1(a) to (g). This processing is made on the receiver side. The optical signal having a waveform such as shown in FIG. 1(b) is inputted to the input terminal 11. This is branched into two streams of optical signals by the optical branch 12. One branch optical signal is applied directly to the optical logical product circuit 15 while the other passes through the optical delay circuit 14 with a delay of one time slot of the original signal 11 and is then applied to the optical logical product circuit 15. The output becomes such a waveform as shown in FIG. 1(d). This output is divided into two optical branch signals, only one of them is delayed, and then they are applied to the logical sum circuit 16 that outputs waveform 18. Since the optical delay circuit 17 has a delay of ½ of a time slot of the original signal 17, the output 18 of the optical logical sum circuit 16 is a waveform as shown in FIG. 1(f).

It is possible to use a star coupler as the optical logical sum circuit 16 and to let it function also as the delay circuit 17 by using a length for one of the input fibers that is different from that of the other.

The optical clock pulse thus obtained can be used as such for optical signal processing. If a sufficient signal-to-noise ratio cannot be secured, it is once passed through an optical PLL and then used for optical signal processing.

Figure 9:
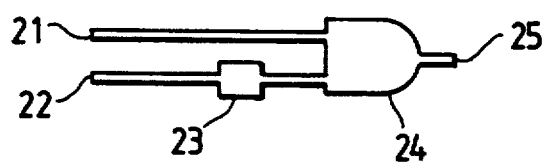

FIG. 9 shows a frame pulse detection circuit. The optical frame pulse such as shown in FIG. 1(g) can be obtained at the output terminal 25 of the optical logical product circuit 24 by inputting the signal of FIG. 1(b) to the input terminal 21 and the clock signal of FIG. 1(f) to the input terminal 22 and delaying the latter in optical delay circuit 23 by ¼ of the time slot of the original signal.

In this manner, since the overhead signals (frame pulse, alarm signal, audio signal for order wire address signal for switching, etc.) can be multiplexed and de-multiplexed easily, the signal processing circuit of a multiplexer, switching equipment or the like can be constituted extremely simply. In other words, it has been necessary in a conventional system to add about five bits, for example, for the frame signal, the alarm signal, etc, in order to multiplex 100-bit pulses: for example, conversion has been made conventionally in such a manner as to store 105 bits in one frame, or in other words, speed conversion has been made at a rate of 100:105 and the reverse operation is carried out on the receiver side. The similar operation has been made at the exchange, that is switching equipment, too, in order to superpose the address signal and the like.

Since it is only necessary in accordance with this embodiment to make multiplexing by use of violation, speed conversion or the like is not necessary and a simple apparatus structure suitable for optical processing can be used.

Figure 10:
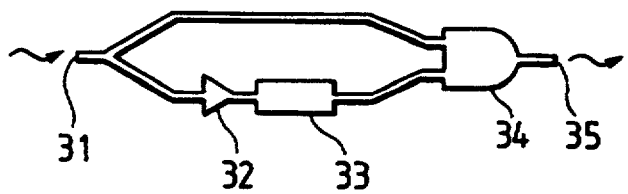

FIG. 10 shows a processing circuit for obtaining the clock pulse from the 1B3B code shown in FIGS. 2(a) to (f). The signal of FIG. 2(b) is inputted to the input terminal 31 and is divided into two branch signals. One of them is passed through the optical inverter 32 and the optical delay circuit 33 to obtain an optical signal such as the one shown in FIG. 2(c) and when this signal is applied to the logical product circuit 34 with the other optical branch signal, the optical output shown in FIG. 2(d) can be obtained at the terminal 35. Delay and add processing is repeated several times for this output by a circuit shown on the right half of FIG. 8, and the clock pulse such as shown in FIG. 2(e) can be obtained.

The clock pulse can be obtained similarly from the 1B2B code shown in FIGS. 5 and 6.

To practice the coding system for improving efficiency by use of a block pair shown in FIGS. 11(a) to (d), one more logical product gate 6 is added to the circuit shown in FIG. 7 (to which a clock and violation v₂ are inputted) and is connected to the logical product gate 7.

The description given above explains the case where the block length is 4 but when the block length is further increased, another logical product gate may be added. In the case of the block length of 6, for example, one more gate is added and when it is 8, two more gates are added and the corresponding clock and violation are inputted.

The embodiment shown in FIG. 8 can as such be used in order to practice the function shown in FIG. 12. When the block length is increased such as when it is 6, for example, the delay quantity of the delay line 14 is increased in accordance with the increase in the block length and the number of branches is increased to 3 and each delay quantity is set to ⅔, ⅓ and 0 of one block length, respectively.

Extension can be made similarly when the block length is further increased.

Figure 23A:
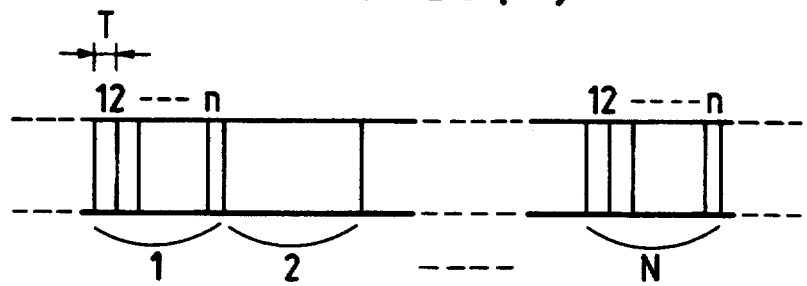
Figure 23B:
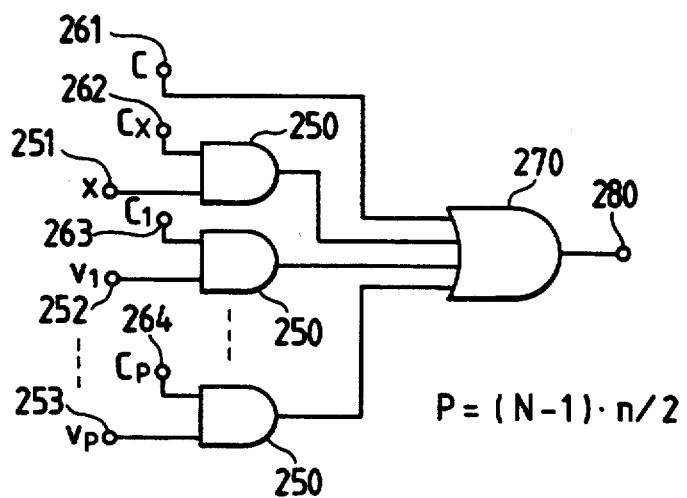

Generally, the multiplexing circuit on the transmission side becomes such as the one shown in FIG. 23(b) if one block has n bits (with n representing an even number), N blocks are combined for coding, and only one block is not permitted to include violation, as shown in FIG. 23(a).

After the signal x and violation $v_1, \ldots v_p$ are subjected to the logical product calculation by the corresponding clocks $c_x, c_1, \ldots c_p$ (where $p=(N-1)$ n/2) at the gates 250, the products are subjected to the logical sum calculation by the gate 270 with the clock c representing "1" at the leading part of each block and is outputted to the terminal 280 and transmitted from it.

Figure 23C:
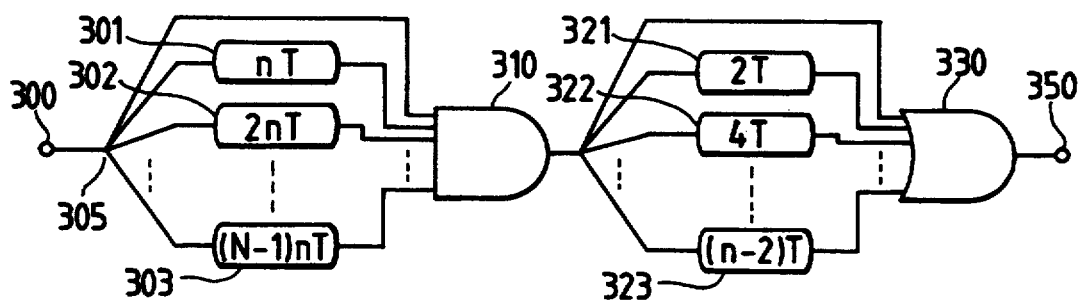

On the other hand, a circuit for extracting the clock component on the receiver side is such as the one shown in FIG. 23(c). Namely, the signal inputted to the terminal 300 and delay signals delayed by respective delay lines 301~303 by nT, 2nT, . . . , $(N-1)_n T$ (with T representing the duration of one pulse) are subjected to the logical product calculation by the gate 310 and its output and signals delayed by 2T, 4T, . . . , (n−2)T by respective delay lines 321~323 are subjected to the logical sum calculation by the gate 330. In this manner the clock component can be extracted at the output 350.

Though the description given above explains the case of the even number, it would be obvious that expansion can be made similarly in the case where n is an odd number.

Coding shown in FIG. 16 can be practiced by making the similar circuit addition explained with reference to FIG. 11 for the circuit shown in FIG. 7. However, the clock pulse corresponding to x must be changed to have a two-block period. The embodiment shown in FIG. 8 can as such be used for clock extraction on the receiver side (FIG. 17).

Coding shown in FIG. 18 can likewise be practiced by adding the logical product gates 6 (two gates) for inputting $v_2$ and $v_4$ to the circuit shown in FIG. 7 and the embodiment shown in FIG. 8 can as such be used for clock extraction (FIG. 19).

To expand the embodiments shown in FIGS. 16 through 19 for general cases, the method analogous to the one shown in FIG. 23 may be employed obviously.

Next, another embodiment of the invention when the digital transmission system of the invention is applied to a multiplexing transmission terminal station will be explained with reference to FIGS. 20 through 22.

In FIG. 20, the signal transmitted from the multiplexing apparatus 100 is received by the demultiplexer 102 through the transmission line 101.

In the multiplexing apparatus 100, the information signal x and violation pulse $v_1$ are inputted from the input terminals 103 and 104, respectively, for the signal as shown in FIG. 18 and are sampled by the corresponding clocks $C_x$ and $C_1$ inputted from the corresponding input terminals 107 and 108 at the logical product gates 111 and applied to the logical sum circuit 112. The information representing how the signal is multiplexed with x and $v_1$ is inputted by $v_2$ from the input terminal 105. The frame pulse $v_4$ as the standard for multiplexing is inputted from the input terminal 106. The logic "1" at the leading part of each block is inputted as the clock c from the input terminal 115.

The signal which is multiplexed as described above and transmitted through the transmission line 101 is received by the demultiplexer 102, is inputted to the logical product gates 125, is separated by the clock pulses inputted to the input terminals 120~123 of the same gates and is outputted to each output terminal 126~129.

The generation method of the clock pulses $c_x, c_1, c_2, c_4$ for separating the signal as described above will be explained next. First of all, the clock component is extracted from the signal thus received by the logical processing circuit 130 which is the same as the circuit explained with reference to FIG. 8. The demultiplexing clock generator 140 generates the clocks for signal demultiplexing by use of the clock component and the received signal and the clocks are outputted to output terminals 151~154. Its principle will be explained with reference to FIGS. 21 and 22.

Figures 21, 22A, 22B, 22C, 22D, 22E:
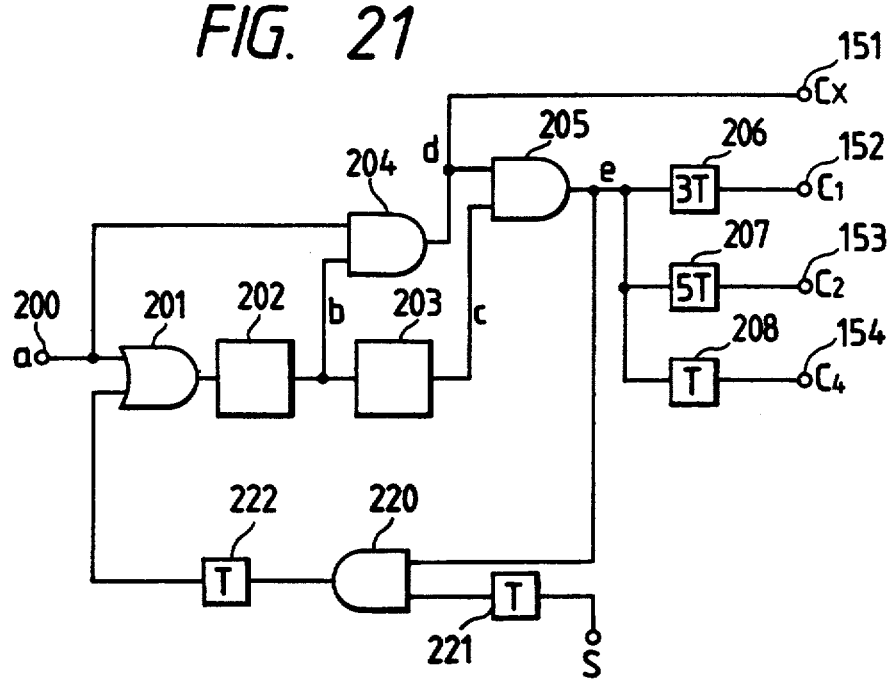

The clock pulse shown in FIG. 22(a) is inputted to the input terminal 200 in FIG. 21. This is extracted by the logical processing circuit 130 shown in FIG. 20 and has the same waveform as the waveform shown in FIG. 19(e). The clock pulse is frequency-divided by the flip-flop 202 after passing through the logical sum gate 201 shown in FIG. 21. As a result, there can be obtained the waveform such as shown in FIG. 22(b). This is further frequency-divided by the flip-flop 203 and there can be obtained the waveform such as shown in FIG. 22(c). The gate 204 calculates the logical product of the signals of FIGS. 22(a) and (b) and its waveform is such as shown in FIG. 22(d). This is outputted to the output terminal 151 as the separation clock $C_x$ for separating the signal x.

Next, the gate 205 calculates the logical product of the waveforms shown in FIGS. 22(c) and (d). This is the waveform shown in (e). The waveform is delayed by 3 time slots (3T) of FIG. 22(a) by the delay circuit 206 and outputted to the output terminal 152 as the clock $c_1$ for separating the violation $v_1$. Similarly, the waveforms delayed by 5T and T are $c_2$ and $c_4$, respectively, and are outputted to 153 and 154.

The description given above is based on the assumption that phase synchronization of the separation clocks is established. Next, countermeasures when synchronization is not established will be explained. The gate 220 is used for this purpose. The phase of the clock e of FIG. 22(e) for separation is synchronized with the third time slot x of the second block of the block pair shown in FIG. 18. The portion which is ahead of this time slot by one time slot is always 0 and the present invention pays specific attention to the fact that this relation is insured only in these time slots.

Assuming that synchronization is established, therefore, the output of the logical product between the separation clock e of FIG. 22(e) (whose phase is synchronized with x of the second block in FIGS. 18(d) and the signal obtained by delaying the multiplexing signal y(t) in FIG. 18(d) by one time slot by the gate 220 is always 0. Accordingly, no influence at all is exerted on the output waveform of the logical sum gate 201.

On the other hand, when synchronization collapses, the output of the logical product gate 220 could become 1 and when this output is delayed by one time slot by the delay circuit 222 and is applied to the logical sum circuit 201, the phase of the output of the flip-flop 202 is inverted so that the phases of the demultiplexing clocks (d) and (e) shift. In this manner, the shift continues until finally a correct phase is attained.

As described above, multiplexing and demultiplexing can be accomplished by use of an extremely simple circuit by use of such devices with limited capabilities as flip-flop, logical sum, logical product and delay lines.

Accordingly, the present invention can be applied to all optical transmission.

Though the description given above deals with the multiplexing and demultiplexing, it can be used as an interface of switching if transmission is made by multiplexing, in v₂ in the embodiment described above, connection signals and address signals which are necessary for the exchange or switching of signals. Accordingly, the embodiment can solve the problems such as processing of these overhead signals and clock recovery that could become bottlenecks in accomplishing optical switching in the future.

Interconnection of circuits made inside the apparatus can be attained by use of entirely the same structure as described above. Interconnection involves the problems that multiplexing becomes complicated and extraction of the clock results in the increase in the cost in the prior art technique, but the present invention can solve these problems.

In accordance with the present invention described above, it becomes possible not only to simplify a short distance transmission apparatus but also to provide transmission codes suitable for processing signals only by an optical system. Moreover, extraction of the clock signals by optical processing alone becomes possible. The present invention provides extremely great effects for accomplishing a large capacity transmission line suitable for an all optical network.

In electrical processing according to the prior art, tank circuits or phase locked loop circuits have been successfully employed for extracting encoded signals or for extracting a clock from an electric signal. However, it is considered very difficult to employ said optical tanks or optical phase locked loops, and their employment would not lend itself to small scale devices. While an increase in data rate by an encoding scheme such as 1B4B would increase the data rate to a point where crosstalk in small circuits for electrical processing would be extremely limiting or intolerable, optical processing has no such problem relating to crosstalk. Further, there is a three order increase in the speed of optical processing over electronic processing, so that coding such as 1BnB presents no problem in the optical domain.

The present invention is particularly useful for encoding optical signals with multiplexed overhead signals through the violation technique. Small scale devices or circuits are particularly easily obtained by the present invention, in the optical domain, or in the electrical domain, because only logical processing is employed that lends itself to integration on a single substrate. The present invention provides an economical, reliable, simple and small scale method and apparatus for extracting a carried clock and demultiplexing overhead signals, particularly a framing signal. The clock may be extracted first quite easily, and thereafter used for retiming the extracted original data stream and/or overhead signals.

While a preferred embodiment has been set forth along with modifications and variations to show specific advantageous details of the present invention, further embodiments, modifications and variations are contemplated within the broader aspects of the present invention, all as set forth by the spirit and scope of the following claims.

I claim:

1. A digital transmission system for multiplexing and demultiplexing signals, including:

means for converting an original signal to a transmission code having at least one transition point in each portion of the code corresponding to an original time slot, and the code having the original signal information in superposition with overhead signals by coding rule violations;

means for transmitting the transmission code as a pulse signal;

means for receiving the transmission code at a remote location as a received waveform; and means for logically processing only the pulse signal and derivatives thereof at the remote location to thereby obtain continuous clock signals and for separating the original signal and superposition overhead signals;

wherein said means for logically processing includes delay means, bi-stable elements, logical sum elements and logical product elements.

2. A digital transmission system according to claim 1, wherein said means for logically processing further includes signal inversion elements.

3. A digital transmission system according to claim 2, wherein said logical sum elements include an optical star coupler circuit means also functioning as said delay means by having different length input/output lines.

4. A digital transmission system according to claim 1, wherein said means for converting uses a mBnB (m<n) code for code conversion.

5. A digital transmission system according to claim 4, wherein said means for converting uses a 1B4B code for code conversion, with the first bit always used as a mark, the second and fourth bits used for violation and the third bit corresponding to "1" or "0" of the original signal.

6. A digital transmission system according to claim 5, wherein said means for converting uses data blocks used for said violation and data blocks not used for said violation arranged alternately.

7. A digital transmission system according to claim 4, wherein said means for converting uses a 1B3B code for code conversion, with the first bit always used as a mark, the second corresponding to "1" or "0" of the original signal and the third bit used for violation.

8. A digital transmission system according to claim 7, wherein said means for converting uses data blocks used for said violation and data blocks not used for said violation arranged alternately.

9. A digital transmission system according to claim 4, wherein said means for converting uses a 1B2B code for code conversion.

10. A digital transmission system according to claim 4, wherein said means for converting uses data blocks used for said violation and blocks not used for said violation arranged alternately.

11. A digital transmission system according to claim 10, wherein said means for converting uses a (n/2−1)BnB code (n is an even number) for code conversion.

12. A digital transmission system according to claim 10, wherein said means for converting uses a ((n−1)/2)BnB code (n is an odd number) for code conversion.

13. A digital transmission system according to claim 10, wherein at least one of said data blocks used for said violation and at least one of said data blocks not used for said violation are used as a set.

14. A digital transmission system according to claim 13, wherein said means for converting uses a (n/2−1)BnB code (n is an even number) for code conversion.

15. A digital transmission system according to claim 14, wherein specific code bit time slots inside said blocks not using said violation are inverted and specific code bit time slots inside said blocks using said violation are forced to be 0 or 1 in such a manner that the inversion does not affect extraction of said clock component by logical processing.

16. A digital transmission system according to claim 13, wherein said means for converting uses a ((n−1)/2)BnB code (n is an odd number) for code conversion.

17. A digital transmission system according to claim 13, wherein specific code bit time slots inside said blocks not using said violation are inverted and specific code bit time slots inside said blocks using said violation are forced to be 0 or 1 in such a manner that the inversion does not affect extraction of said clock component by logical processing.

18. A digital transmission system according to claim 1, wherein said logical sum elements include optical star coupler circuit means also functioning as said delay means by having different length input/output lines.

19. A digital transmission system according to claim 1, wherein said means for logically processing uses said clock signals extracted logically for separating at least one of the original signal and overhead signals.

20. A digital transmission system according to claim 19, wherein said means for logically processing further includes signal inversion elements.

21. A digital transmission system according to claim 1, wherein all the overhead signals are multiplexed by use of coding rule violations.

22. A digital transmission system according to claim 1, wherein said means for converting forms said transmission code in such a manner that 1 follows zero and zero follows 1 periodically, and zero occurs every at least one bit in part of said blocks.

23. A digital transmission system according to claim 1, wherein the means for receiving the transmission code at a remote location does so via at least one intermediate signal processor stage, and wherein the logical processing means further processes only the pulse signal and derivatives thereof at each said intermediate signal processor stage and at the remote location to obtain the continuous clock signals.

24. A digital transmission system according to claim 1, wherein said means for converting forms said transmission code in such a manner that 1 follows zero and zero follows 1 periodically, and zero occurs continuously in part of said blocks.

25. An optical interconnection system for a binary digital data stream, comprising:
a substrate;
a plurality of wiring on said substrate;
signal transmission means on said substrate;
means which multiplexes signals by use of violation to produce a binary signal for transmission being on said substrate;
means for receiving the transmitted binary signal at a remote location; and
means to extract information from the transmitted binary signal by phase shift processing of the transmitted binary signal and by logical processing being on said substrate, including means for logically processing only the transmitted binary signal and derivatives thereof at the remote location to obtain continuous clock signals from the transmitted binary signal.

26. An optical interconnection system as claimed in claim 25, wherein said logical processing means further logically processes only the transmitted binary signal and derivatives thereof at each intermediate processor stage between the multiplexing means and the remote location to obtain the continuous clock signals.

27. A method of optically transmitting an original binary digital data stream comprising the steps of:
converting the original binary data stream into an encoded binary digital data stream having a built-in clock signal correlated to the data rate of the original binary data stream and having each of one of the high and low bits of the original binary data stream represented by a fixed number of code bits greater than one;
multiplexing an overhead signal with the encoded binary digital data stream by violation by inverting one of said code bits for each pulse of the overhead signal being multiplexed;
transmitting the encoded binary digital data stream from one physical location to another physical location;
shifting a phase of the encoded binary digital data stream to obtain a shifted binary digital data stream; and
logically processing only the transmitted encoded binary digital data stream, the shifted binary digital data stream and derivatives thereof at said another physical location to obtain continuous clock signals from the transmitted encoded binary digital data stream.

28. An optical transmission method according to claim 27, including at said another physical location, demultiplexing said encoded binary digital data stream by only employing logical combinations of at least two of the encoded binary digital data stream, a delay of the encoded binary digital data stream, the output of a logical combination, and the delayed output of a logical combination, at least to obtain a signal consisting of pulses corresponding to said overhead signal.

29. An optical transmission method according to claim 27, including extracting a clock consisting of a series of pulses having a data rate that is a whole number multiple or whole number division of said built-in clock signal, at said another physical location, by only employing logical combinations of at least two of the encoded binary digital data stream, a delay of the encoded binary digital data stream, the output of a logical combination, and the delayed output of a logical combination.

30. An optical transmission method according to claim 29, further including dividing the frequency of the extracted clock to obtain other clock signals, and thereafter combining said other clock signals logically as part of said step of employing.

31. An optical transmission method according to claim 29, further including retiming and reshaping the extracted clock with a phase lock loop.

32. An optical transmission method according to claim 27, including extracting the original binary digital data stream at said another physical location by only employing logical combinations of at least two of the encoded binary digital data stream, a delay of the encoded binary digital data stream, the output of a logical combination, and the delayed output of a logical combination.

33. An optical transmission method according to claim 32, further comprising the steps of, at said another physical location, demultiplexing said encoded binary digital data stream by only employing logical combinations of at least two of the encoded binary digital data stream, a delay of the encoded binary digital data stream, the output of a logical combination, and the delayed output of a logical combination, at least to obtain a signal consisting of pulses corresponding to said overhead signal; and extracting a clock consisting of a series of pulses having a data rate that is a whole number multiple or whole number division of said built-in clock signal, at said another physical location, by only employing logical combinations of at least two of the encoded binary digital data stream, a delay of the encoded binary digital data stream, the output of a logical combination, and the delayed output of a logical combination.

34. An optical transmission method according to claim 27, wherein all of said steps are performed only in the optical domain.

35. An optical transmission method according to claim 27, wherein said step of converting is conducted so that there are two times as many code bits as encoded original bits.

36. An optical transmission method according to claim 27, wherein said step of converting is conducted so that only the high bits of the original binary digital data stream are encoded with code bits.

37. An optical transmission method according to claim 27, wherein said step of converting is conducted so that there are three times as many code bits as original encoded bits.

38. An optical transmission method according to claim 27, wherein said step of converting is conducted so that there are four times as many code bits as original bits to be encoded.

39. An optical transmission method according to claim 27, wherein said step of converting is conducted so that for each time slot of said each of one of the high and low bits, the code bits consist of a transition bit, a first violation bit, a code bit representing an original bit to be encoded, and a second violation bit.

40. An optical transmission method according to claim 39, wherein said step of converting is conducted so that said code bits further include, after said second violation bit, a transition bit, an inverted transition bit, a bit corresponding to the original bit encoded and a second inverted transition bit, all for two bits of the original code.

41. An optical transmission method according to claim 27, wherein said step of converting is conducted so that for each time slot of said each of one of the high and low bits, the code bits consist of transition bit, a first violation bit, and a code bit representing the original bit to be encoded; and wherein said step of multiplexing is conducted so that said overhead signal is a plurality of framing bits occurring in only one set of code bits out of many sets of code bits corresponding respectively to many original bits being encoded.

42. An optical transmission method according to claim 27, including performing said steps of converting, multiplexing and transmitting in an integrated circuitry on a single substrate.

43. An optical transmission method according to claim 42, wherein all of said steps are performed only in the optical domain.

44. An optical transmission method according to claim 27, further comprising the step of, at said another physical location, demultiplexing said encoded binary digital data stream by only employing logical combinations of at least two of the encoded binary digital data stream, a delay of the encoded binary digital data stream, the output of a logical combination, and the delayed output of a logical combination, at least to obtain a signal consisting of pulses corresponding to said overhead signal; and extracting a clock consisting of a series of pulses having a data rate that is a whole number multiple or whole number division of said built-in clock signal, at said another physical location, by only employing logical combinations of at least two of the encoded binary digital data stream, a delay of the encoded binary digital data stream, the output of a logical combination, and the delayed output of a logical combination.

45. An optical transmission method according to claim 44, including performing said steps of demultiplexing and extracting in an integrated circuit on a single substrate.

46. An optical transmission method according to claim 45, wherein all of said steps are performed only in the optical domain.

47. An optical transmission method according to claim 45, including extracting the original binary digital data stream, at said another physical location by only employing logical combinations of at least two of the encoded binary digital data stream, a delay of the encoded binary digital data stream, the output of a logical combination, and the delayed output of a logical combination.

48. An optical transmission method according to claim 47, wherein all of said steps are performed only in the optical domain.

49. An optical transmission method according to claim 27, further comprising the steps of, at said another physical location, demultiplexing said encoded binary digital data stream by only employing logical combinations of at least two of the encoded binary digital data stream, a delay of the encoded binary digital data stream, the output of a logical combination, and the delayed output of a logical combination, at least to obtain a signal consisting of pulses corresponding to said overhead signal; and extracting the original binary digital data stream, at said another physical location by only employing logical combinations of at least two of the encoded binary digital data stream, a delay of the encoded binary digital data stream, the output of a logical combination, and the delayed output of a logical combination.

50. An optical transmission method according to claim 49, including performing said steps of demultiplexing and extracting in an integrated circuit on a single substrate.

51. An optical transmission method according to claim 50, wherein all of said steps are performed only in the optical domain.

52. An optical transmission method according to claim 27, including performing all of said steps in a single integrated circuit on a single substrate.

53. An optical transmission method according to claim 52, wherein all of said steps are performed only in the optical domain.

54. An optical transmission method according to claim 27, wherein the logically processing step includes logically processing only the transmitted encoded binary digital data stream and derivatives thereof at each intermediate processing stage between said physical location and said another physical location to obtain the continuous clock signals.

55. A method of optically transmitting an original binary digital data stream comprising the steps of:
 converting the original binary data stream into an encoded two-level digital data stream having a built-in clock signal correlated to the data rate of the original binary data stream and having each of one of the high and low bits of the original binary data stream represented by a fixed number of code bits greater than one;
 multiplexing an overhead signal with the encoded two-level digital data stream;
 transmitting the encoded two-level digital data stream from one physical location to another physical location; and
 at said another physical location, demultiplexing said encoded two-level digital data stream by only employing logical combinations of at least two of the encoded two-level digital data stream, a delay of the encoded two-level digital data stream, the output of a logical combination, and the delayed output of a logical combination, at least to obtain a signal consisting of pulses corresponding to said overhead signal, and to recover at least one of the built-in clock signal and a signal derived therefrom.

56. An optical transmission method according to claim 55, wherein all of said steps are performed only in the optical domain.

57. An optical transmission method according to claim 56, including performing all of said steps in a single integrated circuit on a single substrate.

58. An optical transmission method according to claim 55, including performing all of said steps in a single integrated circuit on a single substrate.

59. An optical transmission method according to claim 55, including extracting a clock consisting of a series of pulses having a data rate that is a whole number multiple or whole number division of said built-in clock signal, at said another physical location, by only employing logical combinations of at least two of the encoded two-level digital data stream, a delay of the encoded two-level digital data stream, the output of a logical combination, and the delayed output of a logical combination; and
 including performing said steps of demultiplexing and extracting in an integrated circuit on a single substrate.

60. An optical transmission method according to claim 59, wherein all of said steps are performed only in the optical domain.

61. An optical transmission method according to claim 55, extracting the original binary digital data stream at said another physical location by only employing logical combinations of at least two of the encoded two-level digital data stream, a delay of the encoded two-level digital data stream, the output of a logical combination, and the delayed output of a logical combination; and
 including performing said steps of demultiplexing and extracting in an integrated circuit on a single substrate.

62. An optical transmission method according to claim 61, wherein all of said steps are performed only in the optical domain.

63. An optical transmission method according to claim 55, including extracting a clock consisting of a series of pulses having a data rate that is a whole number multiple or whole number division of said built-in clock signal, at said another physical location, by only employing logical combinations of at least two of the encoded two-level digital data stream, a delay of the encoded two-level digital data stream, the output of a logical combination, and the delayed output of a logical combination;
 extracting the original binary digital data stream at said another physical location by only employing logical combinations of at least two of the encoded two-level digital data stream, a delay of the encoded two-level digital data stream, the output of a logical combination, and the delayed output of a logical combination; and
 including performing said steps of demultiplexing and extracting in an integrated circuit on a single substrate.

64. An optical transmission method according to claim 63, wherein all of said steps are performed only in the optical domain.

* * * * *